(12) United States Patent
Yasui

(10) Patent No.: US 6,396,655 B1
(45) Date of Patent: May 28, 2002

(54) TAPE LOADING APPARATUS

(75) Inventor: Shinichi Yasui, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 62 days.

(21) Appl. No.: 09/626,222

(22) Filed: Jul. 26, 2000

(51) Int. Cl.[7] ............................................. G11B 15/665
(52) U.S. Cl. ....................................................... 360/85
(58) Field of Search ........................................... 360/85

(56) References Cited

U.S. PATENT DOCUMENTS

| | | | | |
|---|---|---|---|---|
| 4,727,441 A | * | 2/1988 | Tsuchida et al. | 360/85 |
| 4,739,421 A | * | 4/1988 | Narasawa | 360/85 |
| 5,151,832 A | * | 9/1992 | Nagasawa | 360/85 |
| 5,774,300 A | * | 6/1998 | Eum | 360/85 |
| 5,801,898 A | * | 9/1998 | Okuie et al. | 360/85 |

FOREIGN PATENT DOCUMENTS

| | | |
|---|---|---|
| JP | 64-7359 | 1/1989 |
| JP | 10-255356 | 9/1998 |

* cited by examiner

Primary Examiner—Robert S. Tupper
(74) Attorney, Agent, or Firm—Ratner & Prestia

(57) ABSTRACT

A tape loading apparatus suitable for reducing the size of a magnetic recording/reproducing device. The apparatus moves a movable carriage having a tape guide pin imbedded therein along a guide channel using a toggle mechanism comprising a first arm and a second arm; causing the movable carriage to come in contact with a turntable disposed rotatably about an axle proximate to an end of the guide channel the movable carriage turns in a direction so that the tape guide pin gets close to a head cylinder by turning the turntable with a force for moving the movable carriage, and places a magnetic tape at a predetermined angle equal to or greater than 180° around the head cylinder.

23 Claims, 15 Drawing Sheets

TAPE LOADING APPARATUS

FIELD OF THE INVENTION

The present invention relates to a tape loading apparatus used, for instance, in a magnetic recording/reproduction device of the VHS system, for drawing out a magnetic tape from a tape cassette with a tape guide pin and placing the tape at a predetermined angle around a head cylinder having a built-in rotary magnetic head for recording and reproducing. In particular, the invention aims at providing a concrete structure of a tape loading apparatus that reduces the space occupied by employing a toggle mechanism.

BACKGROUND OF THE INVENTION

FIG. 22 and FIG. 23 show a conventional tape loading apparatus employing a toggle mechanism for magnetic recording/reproduction devices used in VHS systems.

In FIG. 22, a head cylinder 1 is provided with a built-in rotary magnetic head (not show in the figure), and a tape cassette 2 contains a magnetic tape 13. Guide channels 3 are formed in a chassis base 12 below the tape cassette 2 and on both sides of head cylinder 1.

As shown in FIG. 23, a movable carriage 4 is provided with a tape loading post 5 and a tape guide pin 6 with a predetermined space between them on an upper surface, and a first guide pin 71 and a second guide pin 72 on a lower surface, both engaged slidably in the guide channels 3. A driving wheel 8 for the tape loading apparatus rotates reversibly as it is driven by a motor (not show in the figure).

The operation of the tape loading apparatus employing a toggle mechanism during loading of the tape will be described with reference to a tape takeup side (which is a right side of the head cylinder 1), in this tape loading apparatus.

A first arm 9 rotates about an arm spindle 10 in an interlinked motion in response to rotation of the driving wheel 8, and one end of a second arm 11 is linked rotatably to another end of the first arm 9. The other end of second arm 11 is rotatably and coaxially connected to the second guide pin 72 on the under surface near a tail end of the movable carriage 4. In other words, the first arm 9 and the second arm 11 constitute a toggle mechanism, which extends and retracts in an interlinked motion in response to the rotation of the driving wheel 8. An extension and retraction of the toggle mechanism moves the movable carriage 4 from underneath of the tape cassette 2 to a position adjacent a side face of the head cylinder 1 along the guide channel 3, or vice versa in a reversed motion. This movement of the movable carriage 4 carries out a tape loading operation by enabling the tape loading post 5 to pull out the magnetic tape 13 from the tape cassette 2, and to place the tape around the head cylinder 1 at a predetermined angle. Alternatively, it carries out an unloading operation by retracting the pulled-out magnetic tape 13 into the tape cassette 2.

In a final step of the above tape loading operation, the movement of the movable carriage 4 is limited at a position where a V-shaped portion provided at a leading end of the movable carriage 4 comes in contact to a cylindrical stopper 22 secured to the chassis base 12. Because a connecting point (the second guide pin 72) of the second arm 11 to the movable carriage 4, at this point of time, is in a near side to the head cylinder 1 with respect to a straight line drawn in phantom between the arm spindle 10 and the stopper 22, a thrusting force of the toggle mechanism causes the movable carriage 4 to turn about the stopper 22 in a direction where the tape guide pin 6 becomes even closer to the head cylinder 1, after the above contact with the stopper 2. Therefore, this structure places the magnetic tape 13 around the head cylinder 1 at a predetermined winding angle of 180° or greater. As shown in FIG. 23, the movable carriage 4 stops at this point when the second guide pin 72 is pressed against a restrictive end 31 formed in continuity with the guide channel 3 at a side close to the head cylinder 1.

What has been described above relates to the toggle mechanism of the tape takeup side with respect to the head cylinder 1 in FIG. 22. However, a toggle mechanism of a tape supply side (i.e. a left side of the head cylinder 1), also includes a similar structure, and it is operated by a driving force of the same driving wheel 8. Reference numerals 14, 15, 16, and 17 respectively represent a sound erasing head 14 (for post-recording), a sound and control signal head 15, a capstan 16, and a pinch roller 17. A reference numeral 161 represents a direct drive motor for driving a capstan 16 or a capstan flywheel driven by an ordinary motor (not show in the figure), and reference numerals 18, 19, and 20 are respective tape guide posts (rollers).

Although the loading operation and the unloading operation of the magnetic tape can be carried out by the above mechanism, there has been a problem that it is difficult to reduce an overall size of the magnetic recording/reproduction devices for reasons that: (1) a space occupied by the toggle mechanism is too large in order for the movable carriage 4 to turn in the direction of becoming closer to the head cylinder 1 by the thrusting force of the toggle mechanism, and to place the magnetic tape 13 around the head cylinder 1 at the predetermined winding angle of 180° or greater; and (2) overall dimensions of the entire magnetic recording/reproduction device need to be sufficiently large in order to avoid an interference with the other functional components such as the sound erasing head 14, the sound and control signal head 15, the capstan 16, the direct drive motor for the capstan 16, or the capstan flywheel driven by an ordinary motor (not show in the figure), the pinch roller 17, and the like.

In view of the afore-mentioned problems, the present invention is intended to provide a toggle mechanism for a tape loading apparatus that reduces a space it occupies, yet it is capable of turning a movable carriage easily in order to move a tape guide pin on the movable carriage closer to the head cylinder.

SUMMARY OF THE INVENTION

A tape loading apparatus of the present invention includes: (a) a chassis base provided with a head cylinder, including a guide channel having a first position and a second position; (b) a movable carriage provided with a tape loading post and a tape guide pin on an upper surface, and a first guide pin and a second guide pin on an under surface, both engaged slidably in the guide channel; (c) a toggle mechanism, one end of which is rotatably connected to the movable carriage, and the other end positioned at one side of the guide channel close to the head cylinder, wherein an extension and retraction movement of the toggle mechanism moves the movable carriage reversibly between the first position and the second position in a sliding manner along the guide channel; and (d) movable carriage turning means for turning the movable carriage in a direction, where the tape guide pin moves close to the head cylinder, at a position in proximity to the second position.

In this structure, the movable carriage turning means forcibly turns the movable carriage before completion of the loading operation, in order to place a magnetic tape at a predetermined angle around the head cylinder, by moving the tape guide pin provided on the movable carriage. Thus, the structure is able to realize a reduction in size and cost of the entire magnetic recording/reproduction device, since: (1) it does not require a complex toggle mechanism because an arm spindle, serving as a rotary axis, of the first arm composing the toggle mechanism can be arranged between the guide channel formed in the chassis base and the head cylinder; and (2) it can reduce an area or space occupied by the toggle mechanism and its movement. The structure can achieve a miniaturization, which is indispensable especially for a combination camera and magnetic recording/reproduction unit.

DESCRIPTION OF THE PREFERRED EMBODIMENTS

Figure 1:
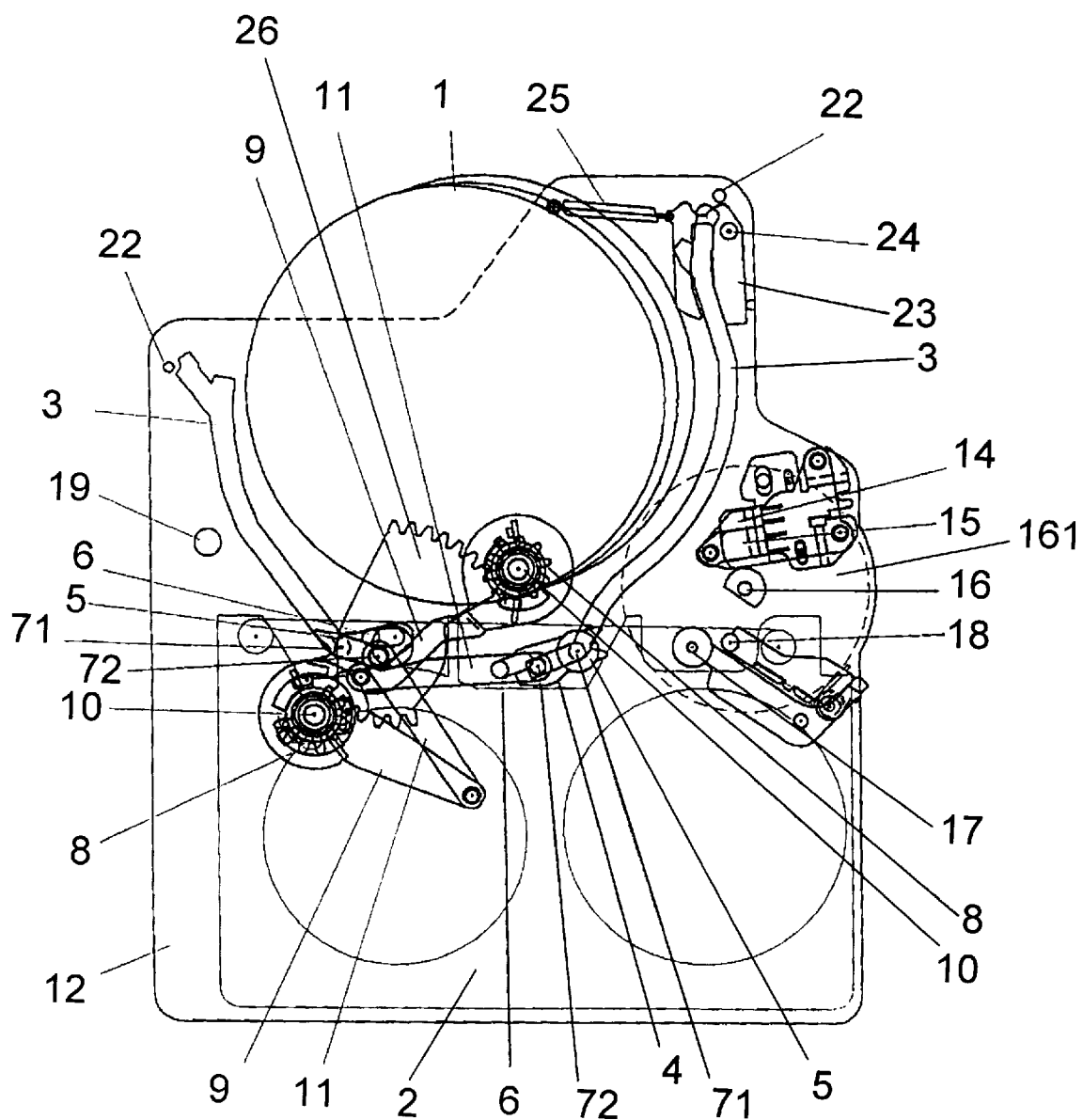
FIG. 1 is a schematic plan view depicting a tape loading apparatus of a first exemplary embodiment of the present invention, at a beginning of a loading operation.

In disclosing a tape loading apparatus in each of the following exemplary embodiments of the present invention, details will be given of a structure and an operation of a tape takeup side of a head cylinder, that is the right side of the head cylinder. However, a similar structure may also be arranged at the tape supply side, i.e. a left side of the head cylinder.

First Exemplary Embodiment

A tape loading apparatus of a first exemplary embodiment of the present invention will be described with reference to FIG. 1 through FIG. 8. Like reference numerals will be used throughout to designate components having like functions as those of the prior art apparatus, and like descriptions will not be repeated.

Figure 2:
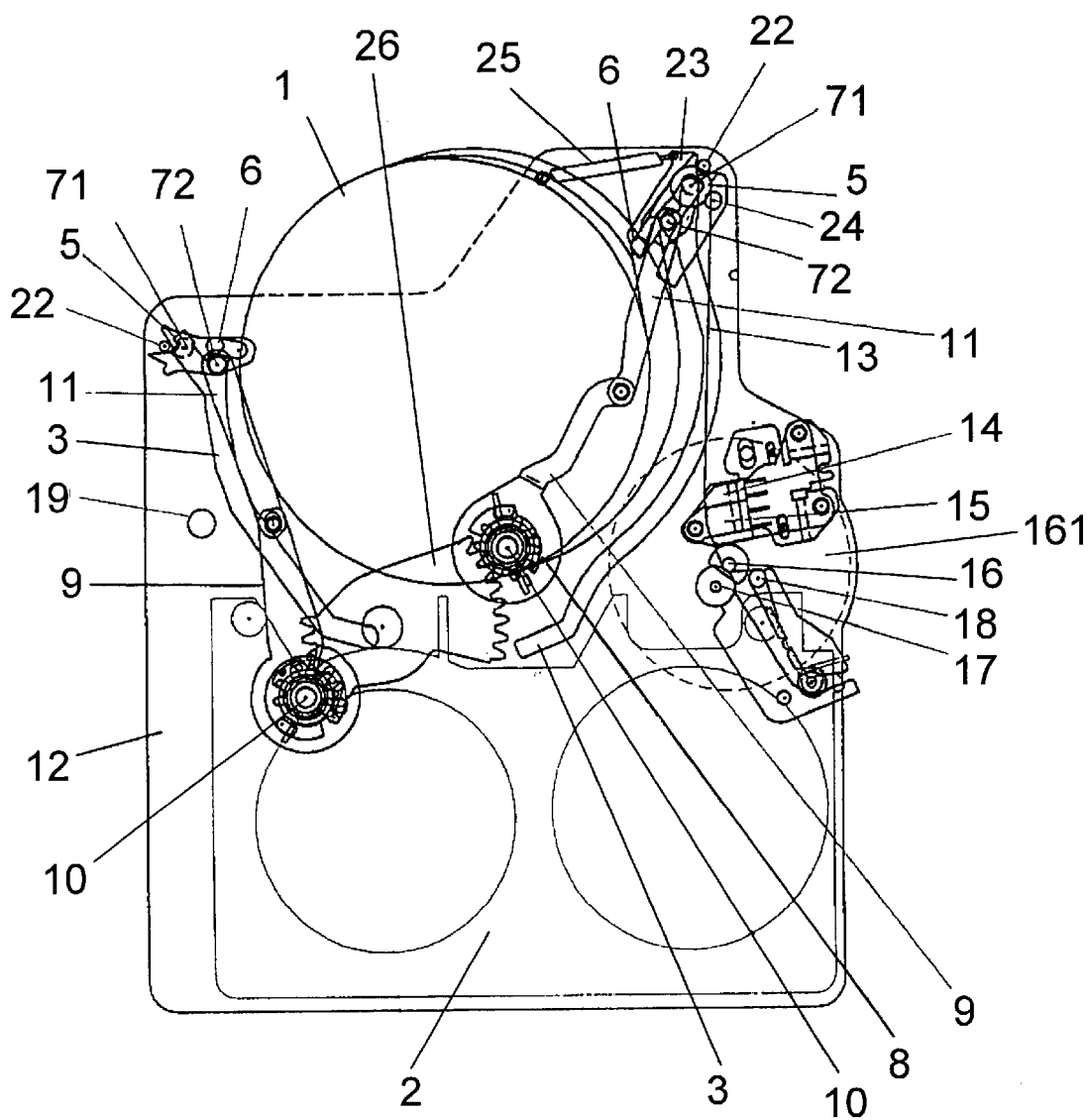
FIG. 2 is a schematic plan view depicting the tape loading apparatus of the first exemplary embodiment of the present invention, upon completion of the loading operation.
Figure 3:
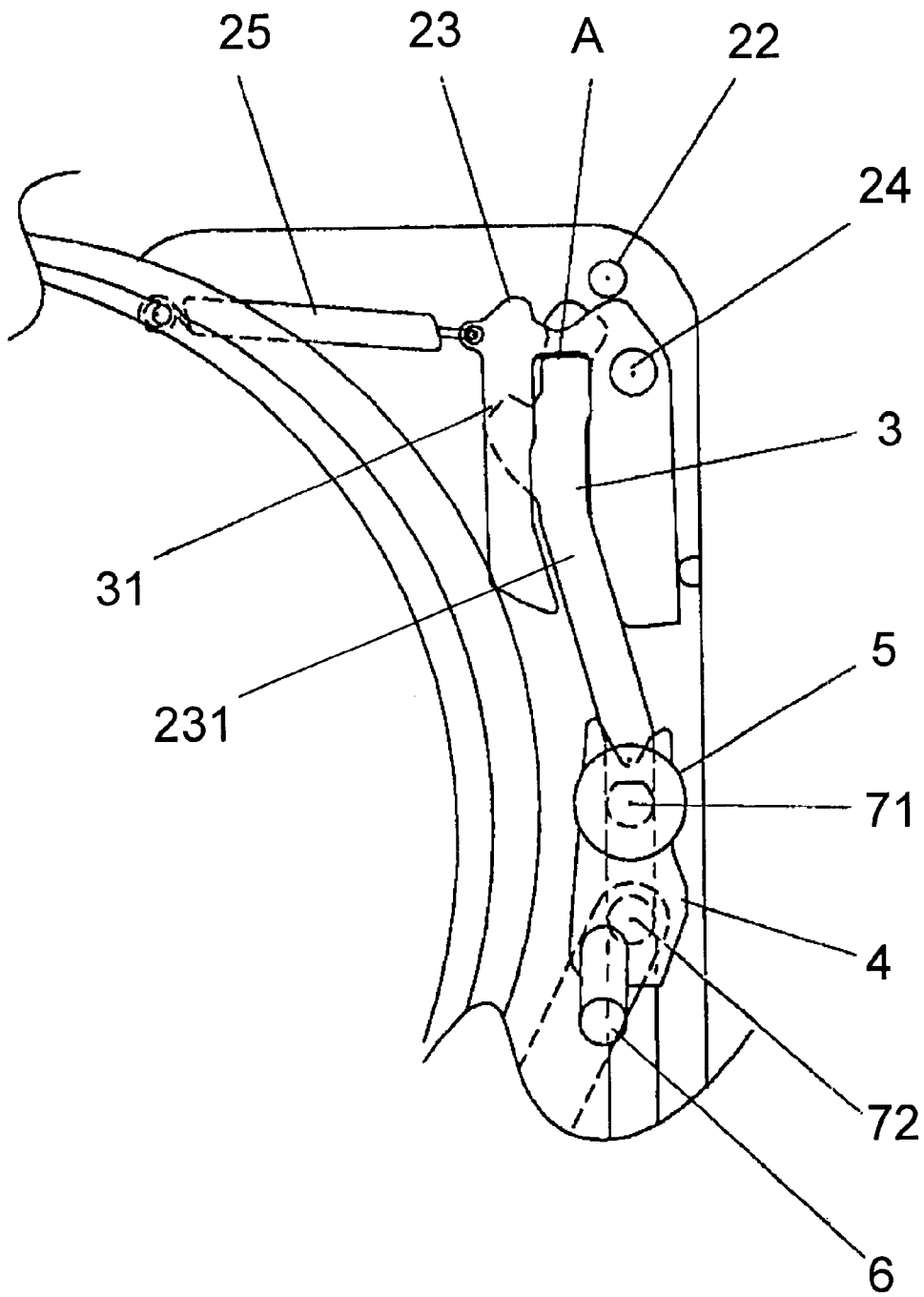
FIG. 3 is a schematic plan view depicting a portion of the tape loading apparatus of the first exemplary embodiment of the present invention, in the middle of the loading operation.
Figure 4:
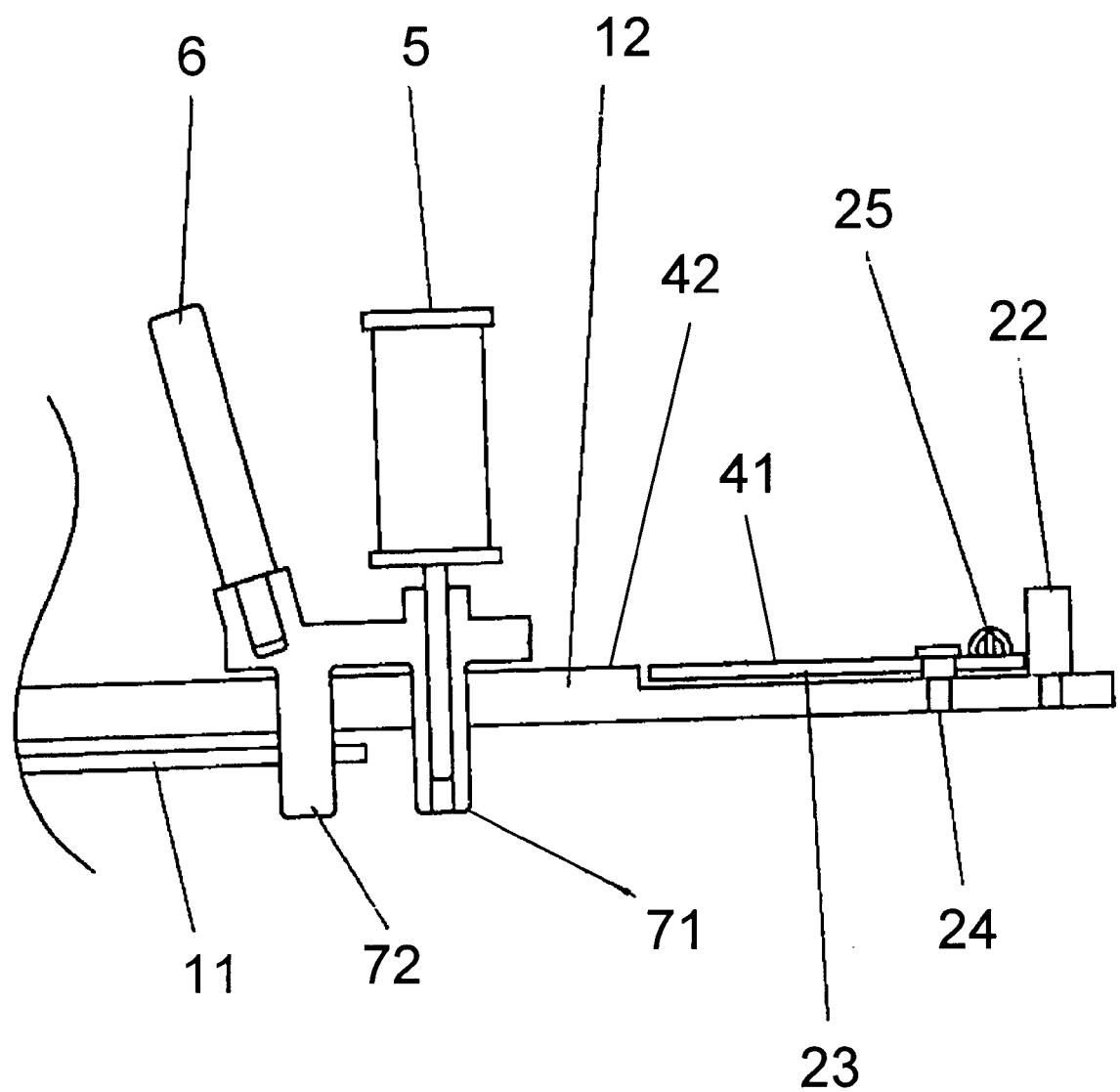
FIG. 4 is a sectional side view depicting a portion of the tape loading apparatus of the first exemplary embodiment of the present invention, in the middle of the loading operation.
Figure 5:
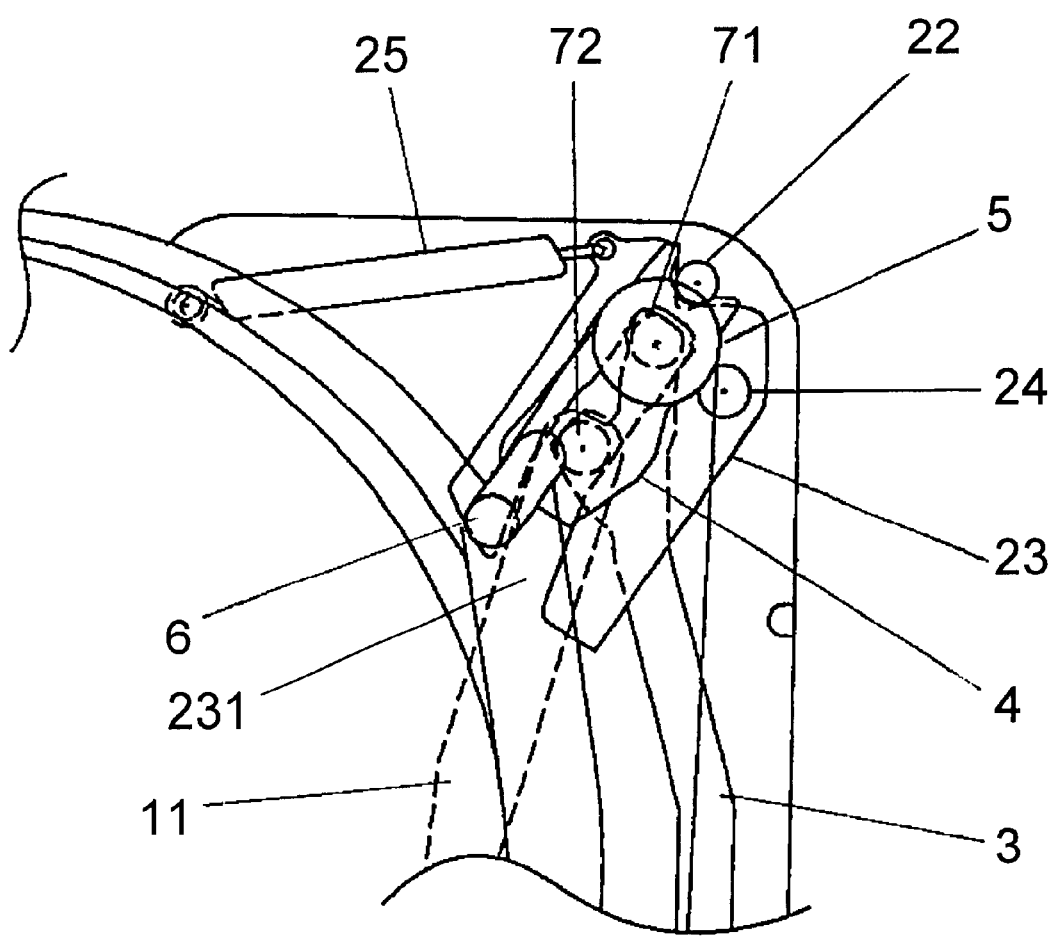
FIG. 5 is a schematic plan view depicting a portion of the tape loading apparatus of the first exemplary embodiment of the present invention, upon completion of the loading operation.
Figure 6:
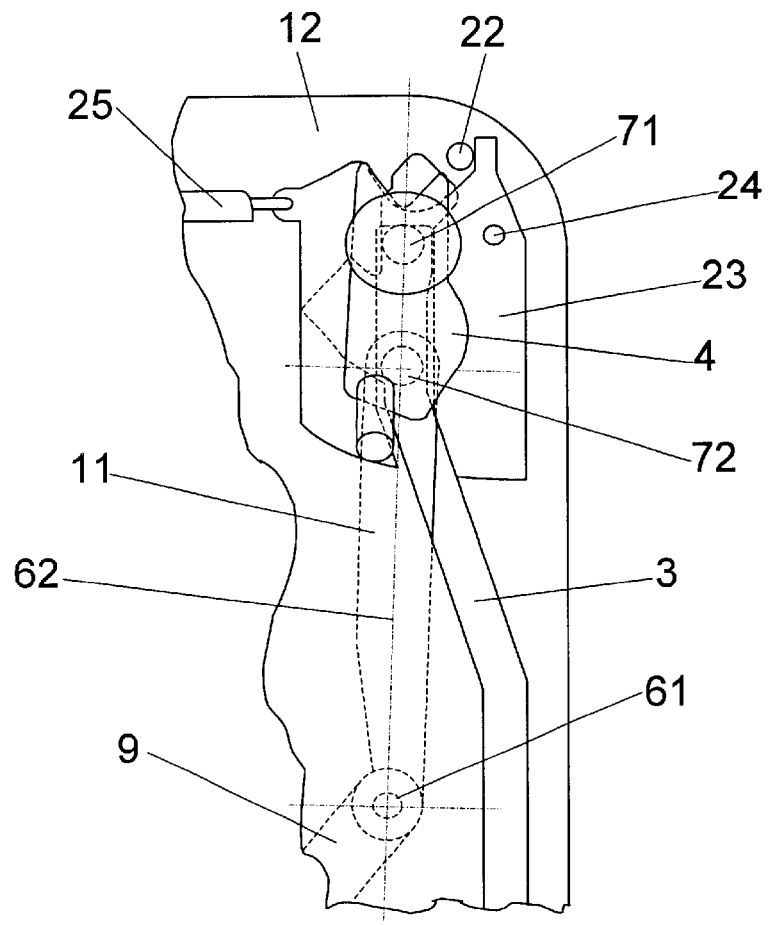
FIG. 6 is a schematic plan view depicting a portion of the tape loading apparatus of the first exemplary embodiment of the present invention, immediately before completion of the loading operation.

FIG. 1 is a schematic plan view depicting the tape loading apparatus of the first exemplary embodiment of the present invention at the beginning of a loading operation (a movable carriage in a first position); FIG. 2 is a schematic plan view of the same apparatus at the completion of the loading operation (the movable carriage in a second position); FIG. 3 is a schematic plan view of a portion of the same apparatus in the middle of the loading operation; FIG. 4 is a sectioned side view of a portion of the same apparatus in the middle of the loading operation; and FIG. 5 is a schematic plan view of a portion of the same apparatus upon completion of the loading operation.

The tape loading apparatus of this exemplary embodiment differs from the toggle mechanism of the prior art with respect that the interval between arm spindles 10 at two locations. This interval is reduced in order to reduce the size of the entire apparatus and to reduce the area that the toggle mechanism occupies. One of the arm spindles 10 supporting a first arm 9, which constitutes one side of the toggle mechanism, for instance, is arranged so as to locate at an inner side, i.e. a side close to a head cylinder 1, of a guide channel 3. In addition, movable carriage rotating means, such as turntable 23 for example, is arranged near an end of the guide channel 3, as shown in FIG. 3, is another point of difference from that of the prior.

The turntable 23 has a plate-like body, mounted rotatably on a chassis base 12 with an axle 24. The turntable 23 is pressed to stay normally in contact with a stopper 22 by a resilient biasing force of a tension spring 25 in a counter-clockwise direction, thereby a rotary movement of turntable 23 is restricted in this position. The turntable 23 is so arranged under this position that a slit 231 having an open end formed in the turntable 23 comes generally into alignment with the guide channel 3 as shown in FIG. 3. In addition, an upper surface 41 of the turntable 23 generally forms a flat surface level with an upper surface 42 of the chassis base 12 about the guide channel 3, as shown in FIG. 4.

FIG. 1 shows a state wherein the movable carriage 4 is situated under a tape cassette 2, which is the first position, at a start of the loading operation.

A sector wheel 26 is rotated under this condition by a driving means, such as a motor or the like (not show in the figure), and a driving wheel 8 engaged with the sector wheel 26 rotates. Rotation of the driving wheel 8 moves the first arm 9, which constitutes the toggle mechanism, fixed to the driving wheel 8. The loading operation is carried out by a second arm 11 linked to the first arm 9. The second arm 11 causes the movable carriage 4 to move along the guide channel 3 in the chassis base 12, as a first guide pin 71 and a second guide pin 72 imbedded on an underside surface of the movable carriage 4, connected rotatably to the second arm 11, slide in the guide channel 3.

A tape loading post 5 provided on an upper surface of the movable carriage 4 is substantially perpendicular to the chassis base 12, as shown in FIG. 3 and FIG. 4. A tape guide pin 6 has a tilted surface of its outer periphery that is generally in parallel to an inclination of the head cylinder 1. A magnetic tape 13 is pulled out by the tape loading post 5 during the loading operation, and barely contacts tape guide pin 6, which is tilted with respect to the chassis base 12. Even if the magnetic tape 13 comes in contact with the tape guide pin 6, an angle at which the magnetic tape 13 winds about the tape guide pin 6 is small so that the magnetic tape 13 is not forcibly pulled out (FIG. 2). Therefore, it is desirable that the tape loading post 5 is made to be a rotatable roller.

Immediately prior to a completion of the loading operation, that is, when the movable carriage 4 is in vicinity of a channel having a restrictive end 31 formed in continuity with the guide channel 3 in the chassis base 12, the first guide pin 71 comes in contact at a small angle to a left side of the slit 231 in the turntable 23. One end of the second arm 11 is connected rotatably to the second guide pin 72. Since the movable carriage 4 is in a rotatable state relatively freely about the second guide pin 72, which is depressed by the second arm 11, it is readily guided along the left side of the slit 231 toward the end marked "A" in the channel without resisting the biasing force of the tension spring 25, which biases the turntable 23 in the counterclockwise direction.

At the moment immediately before completion of the loading operation, the first guide pin 71 and the second guide pin 72 on the movable carriage 4 enter into the slit 231 of the turntable 23 along the guide channel 3, and the first guide pin 71 comes into contact the end A of the slit 231. As the loading operation advances, the first guide pin 71 on the movable carriage 4 depresses the end A, and this causes the turntable 23 to turn clockwise about the axle 24 against the biasing force of the tension spring 25. The clockwise rotation of this turntable 23 pushes the second guide pin 72 on the movable carriage 4 with a side of the slit 231 of the turntable 23, to turn the movable carriage 4 clockwise, and thereby the tape guide pin 6 on the movable carriage 4 moves in a direction approaching the head cylinder 1.

As the loading operation further advances, a V-shaped notched portion in the movable carriage 4 comes into contact upon the stopper 22. As shown in FIG. 5, a position of the V-shaped notched portion in the movable carriage 4 is fixed, similar to the prior art mechanism. The loading operation is completed when the thrusting force of the second arm 11 further moves the second guide pin 72 until it comes into contact with the restrictive end 31 formed in continuity to the guide channel 3, and thereby a position of the movable carriage 4 is fixed. The magnetic tape 13 is thus placed at a predetermined angle around the head cylinder 1 by keeping the movable carriage 4 in this second position, in the manner described above.

Accordingly, the magnetic tape 13 is placed around the head cylinder 1 by the movement of the tape guide pin 6 on the movable carriage 4 in the direction approaching the head cylinder 1. The magnetic tape 13 is pulled out by the tape loading post 5 of the movable carriage 4 in a posture generally perpendicular to the chassis base 12 until the moment immediately before completion of the loading operation. Therefore, there is no need to force the magnetic tape 13, and excessive distortion during the loading operating is advised. In addition, use of the rotatable roller for the tape loading post 5 substantially reduces a load required for pulling out the magnetic tape 13, thereby providing an advantage that undesirable tension is not placed on the magnetic tape 13. Therefore, distortion of the magnetic tape 13 is reduced.

There is described now a consideration given to an embodiment wherein the arm spindle 10 for supporting the first arm 9, including one side of the toggle mechanism, is positioned at an inner side of the guide channel 3, or between the guide channel 3 and the head cylinder 1, in order to reduce the area occupied by the toggle mechanism. As shown in FIG. 5, when the toggle mechanism is in its extended state at the moment immediately before completion of the loading operation, a center of the first guide pin 71 is very close to the extension of travel line 62 of the second arm 11 drawn through a center of the arm link pin 61 and a center of the second guide pin 72. The arm link pin 61 connects the second arm 11 rotatably to the first arm 9. The second guide pin 72 connects the movable carriage 4 rotatably to the second arm 11. This means that the toggle mechanism is able to transfer a motive force to the movable carriage 4 only in the traveling direction. Therefore the toggle mechanism is unable to provide the movable carriage 4 with a force that can turn the movable carriage 4, at the moment immediately before completion of the loading operation, as is the case of the prior art.

In the case of this exemplary embodiment, however, a thrusting force in the traveling direction of the movable carriage 4 can also provide a force to turn the turntable 23 clockwise by pushing it forward. A turning movement of the turntable 23 pushes the second guide pin 72 on the movable carriage 4 with a side of the turntable 23 to move the movable carriage 4 clockwise. When the movable carriage 4 turns clockwise, the second guide pin 72 moves toward the head cylinder 1. Accordingly, the thrusting force of the second arm 11 transferred via the second guide pin 72 is capable of turning the movable carriage 4 clockwise with respect to the first guide pin 71. The second guide pin 72 can thus be brought into contact upon the restrictive end 31 of the guide channel 3.

Figure 7:
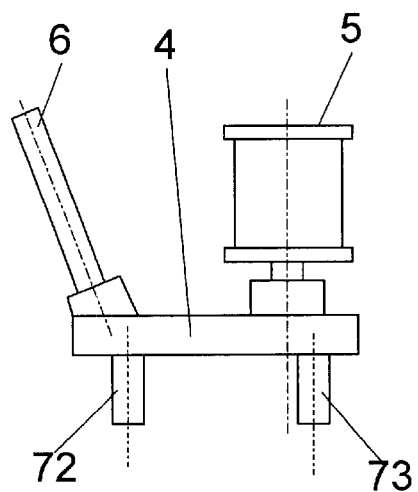
FIG. 7 is a side view outlining an example of a movable carriage of the tape loading apparatus of the first exemplary embodiment of the present invention.
Figure 8:
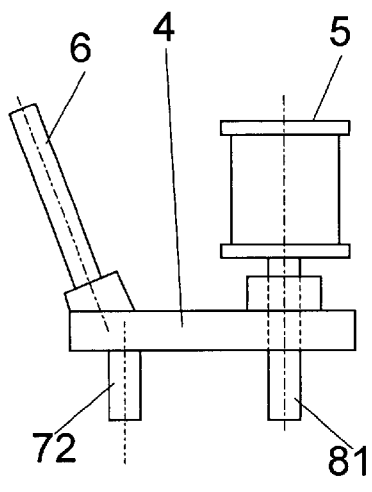
FIG. 8 is a side view outlining another example of the movable carriage of the tape loading apparatus of the first exemplary embodiment of the present invention.

The first guide pin 71 need not be formed coaxially with the tape loading post 5 as shown in FIG. 4. The first guide pin may be formed in a configuration, as shown in FIG. 7 with a reference numeral 73, that an axis is set at a position different from an axis of the tape loading post 5. Alternatively, as shown with a reference numeral 81 in FIG. 8, a post pin 81 for the tape loading post 5 can also be used as a first guide pin.

According to the first exemplary embodiment as described above, a provision of the movable carriage turning means, the turntable 23 for instance, can forcibly turn the movable carriage 4 by the thrusting force of the second arm 11 immediately before completion of the loading operation, even if an orientation of the travel line 62 of the second arm 11 is in a direction not to yield a force to turn the movable carriage 4. It therefore allows the arm spindle 10 disposed in a position between the guide channel 3 in the chassis base 12 and the head cylinder 1, without requiring a complex toggle mechanism, thereby reducing the area occupied by the tape loading apparatus. In addition, the overall size of the entire magnetic recording/reproduction device can be reduced, since there is no interference with other functional components such as a direct drive motor for the capstan, a capstan flywheel, and the like. In other words, a size of the base can be reduced, as an arrangement may be made in such a manner that an audio erasing head, an audio and control signal head, a capstan, a direct drive motor for the capstan or a capstan flywheel, a pinch roller, and the like are in close proximity with the head cylinder. Consequently, the exemplary embodiment can realize a reduction in size and cost of the magnetic recording/reproduction device in its entirety.

Second Exemplary Embodiment

With reference to FIG. 9 through FIG. 12, there is described herein a tape loading apparatus of a second exemplary embodiment of the present invention having a movable carriage turning means different from that of the first exemplary embodiment.

Figure 9:
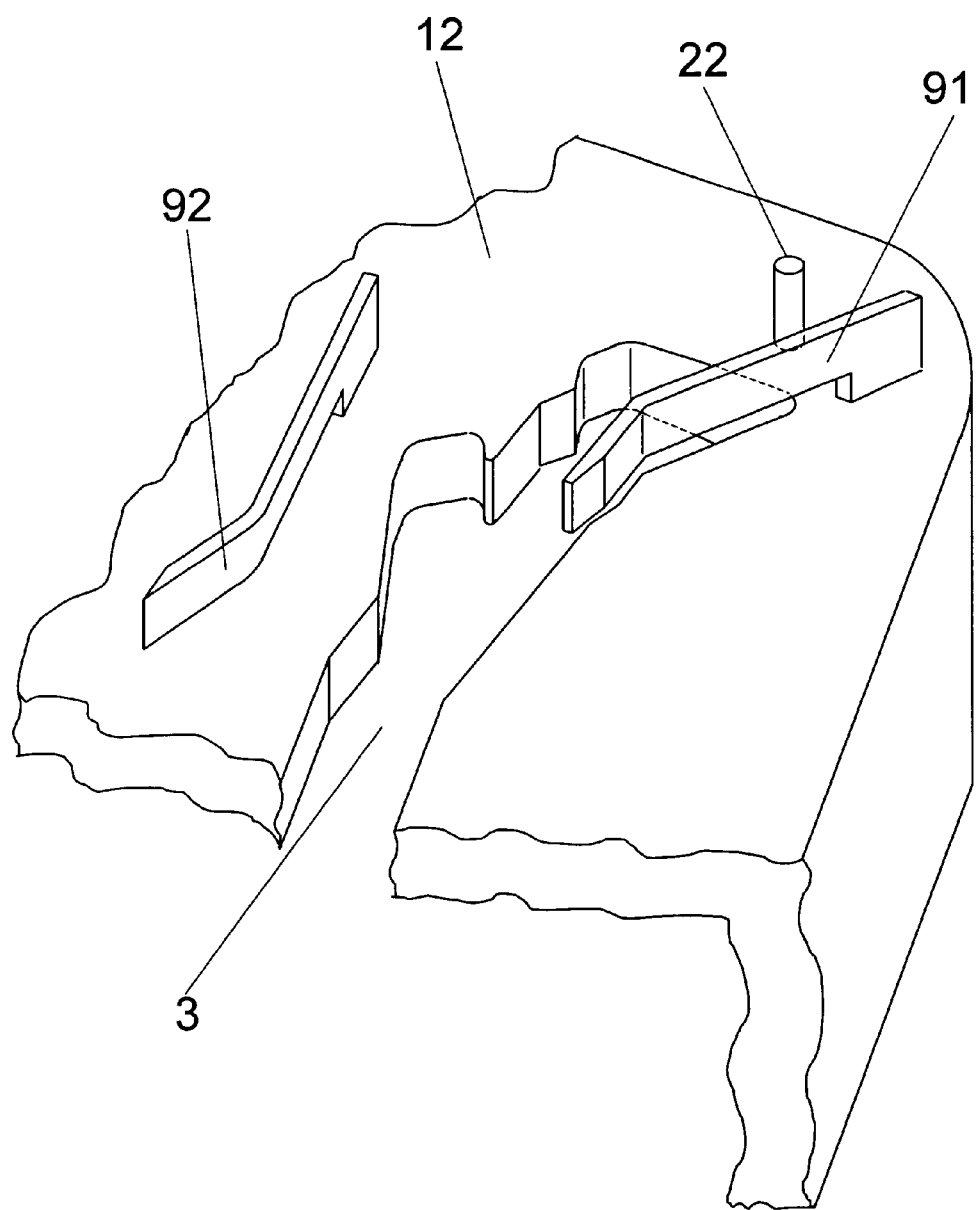
FIG. 9 is a perspective view outlining a portion around a second position of the chassis base illustrating a tape loading apparatus of a second exemplary embodiment of the present invention.
Figure 10:
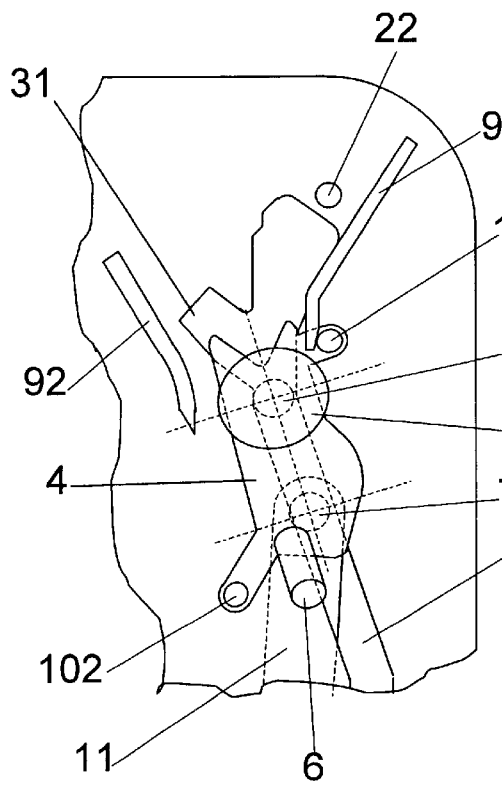
FIG. 10 is a schematic plan view depicting a portion of the tape loading apparatus of the second exemplary embodiment of the present invention, in the middle of a loading operation.
Figure 11:
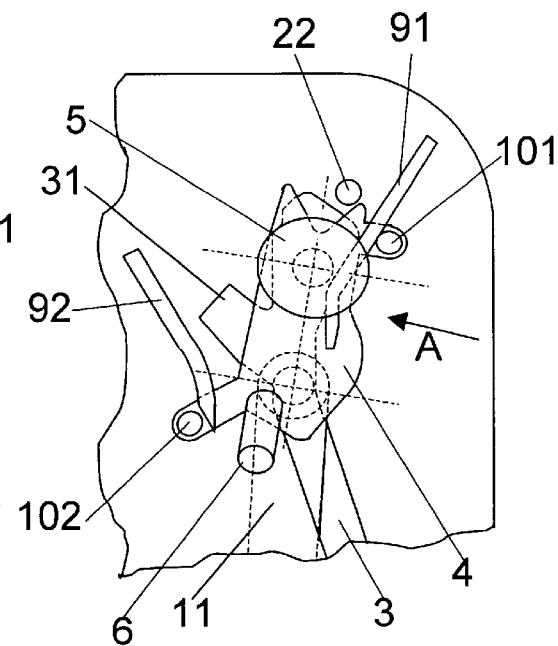
FIG. 11 is a schematic plan view depicting a portion of the tape loading apparatus of the second exemplary embodiment of the present invention, at the moment a movable carriage begins to turn.

FIG. 9 is a perspective view outlining a part of a chassis base 12 around a second position in the second exemplary embodiment of this invention; FIG. 10 is a schematic plan view of a portion of the tape loading apparatus in the middle of its loading operation; FIG. 11 is a schematic plan view of a portion of the same apparatus at the moment the movable carriage turning means begins to turn a movable carriage 4; and FIG. 12 is a side view outlining the portion shown in FIG. 11 as viewed from a direction of arrow A.

In FIG. 9, a first guide wall 91 and a second guide wall 92 are mounted on an upper surface of the chassis base 12 and are generally parallel to a guide channel 3. As shown in FIG. 10, there are disposed a tape loading post 5 and a tape guide pin 6 on an upper surface of the movable carriage 4 similar to the first exemplary embodiment. In addition, a first turning guide pin 101 and a second turning guide pin 102 are also disposed for guiding the movable carriage 4 in a turning motion. Moreover, a first guide pin 71 and a second guide pin 72 are placed on an under surface of movable carriage 4, similar to the first exemplary embodiment. One end of a second arm 11 connects rotatably to the second guide pin 72. A thrusting force of the second arm 11 moves the movable carriage 4 forward, with the first turning guide pin 101 sliding along an outer side of the first guide wall 91 mounted on the chassis base 12. As the loading operation further advances, the first turning guide pin 101 on the movable carriage 4 is shifted along the first guide wall 91, as shown in FIG. 11, in order to guide the movable carriage 4 in a manner so that a stopper 22 mounted on the chassis base 12 is captured in a V-shaped notched portion of the movable carriage 4. At the same time, the second turning guide pin 102 slides along an outer side of the second guide wall 92, causing the movable carriage 4 to turn clockwise.

Figure 12:
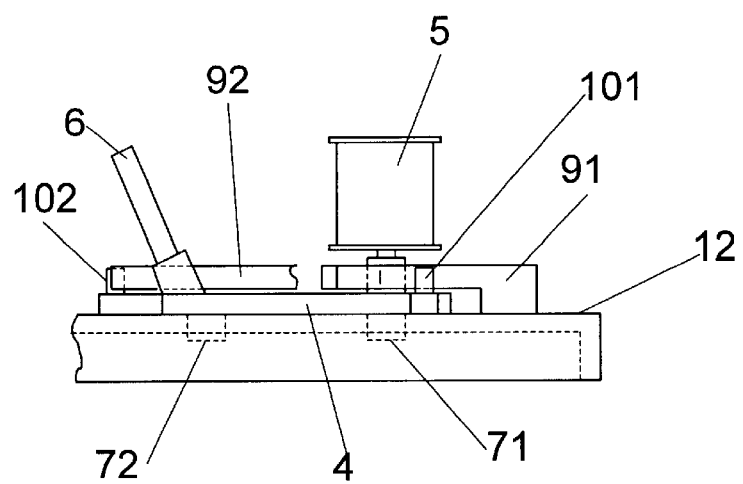
FIG. 12 is a side view outlining the portion shown in FIG. 11 of the tape loading apparatus of the second exemplary embodiment of the present invention, as viewed from the direction of arrow A.

As shown in FIG. 12, both of the first guide wall 91 and the second guide wall 92 provide a space to the upper surface of the chassis base 12, in order for a base portion of the movable carriage 4 to slip in around portions of the first guide wall 91, and the second guide wall 92 where the first turning guide pin 101 and the second turning guide pin 102 slide along respectively. As the loading operation further advances, the second turning guide pin 102 causes the movable carriage 4 to turn clockwise further, and a position of the movable carriage 4 is fixed at the V-shaped notched portion, similar to the first exemplary embodiment. The second guide pin 72 on the movable carriage 4 then comes into contact upon a restrictive end 31 formed in continuity to the guide channel 3. As described, the tape guide pin 6 on the movable carriage 4 moves close to the head cylinder 1 at this second position, and the loading operation is completed when the tape guide pin 6 places a magnetic tape around the head cylinder 1.

According to the second exemplary embodiment described above, the movable carriage 4 can be turned by using the first guide wall and the second guide wall to respectively guide the first turning guide pin and the second turning guide pin on the movable carriage 4 in a sliding manner. This moves the tape guide pin on the movable carriage 4 close to the head cylinder 1, enabling it to place the magnetic tape around the head cylinder, thereby achieving the same effect as in the first exemplary embodiment.

Third Exemplary Embodiment

Referring now to FIG. 13 through FIG. 17, there is described a tape loading apparatus of a third exemplary embodiment of the- present invention having other movable carriage turning means.

Figure 13:
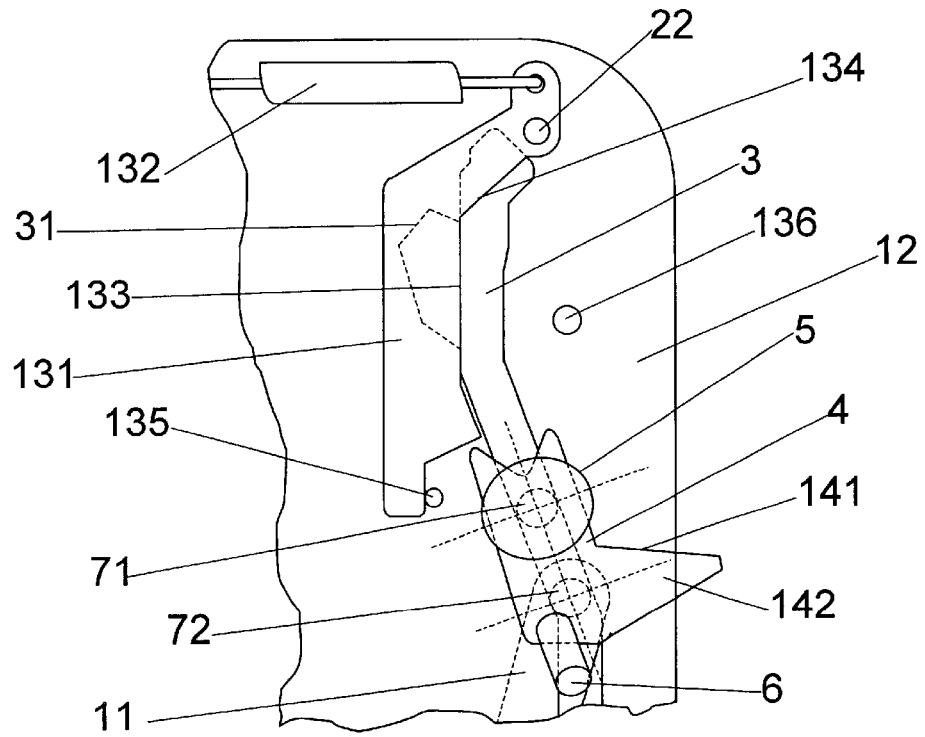
FIG. 13 is a schematic plan view depicting a portion of a tape loading apparatus of a third exemplary embodiment of the present invention, in the middle of a loading operation.
Figure 14:
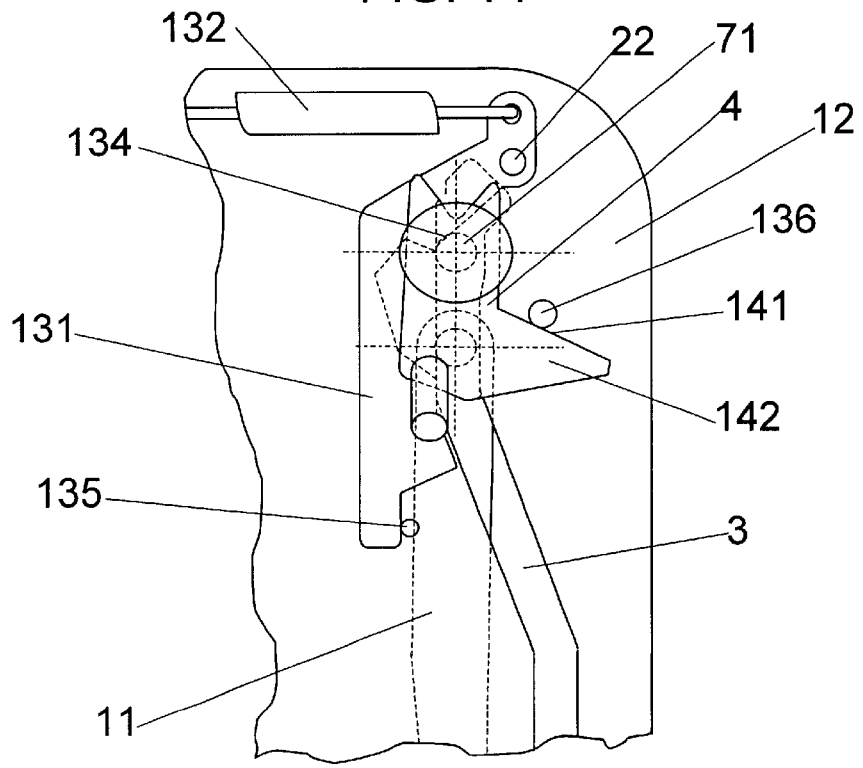
FIG. 14 is a schematic plan view depicting a portion of the tape loading apparatus of the third exemplary embodiment of the present invention, at the moment the movable carriage begins to turn.
Figure 15:
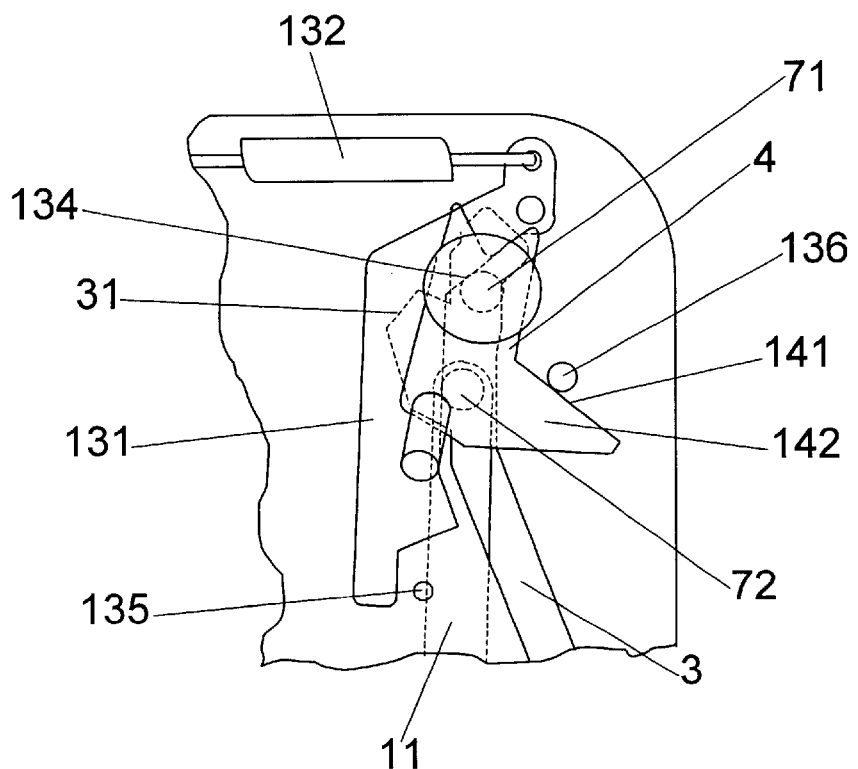
FIG. 15 is a schematic plan view depicting a portion of the tape loading apparatus of the third exemplary embodiment of the present invention, in the middle of a turn of the movable carriage.
Figure 16:
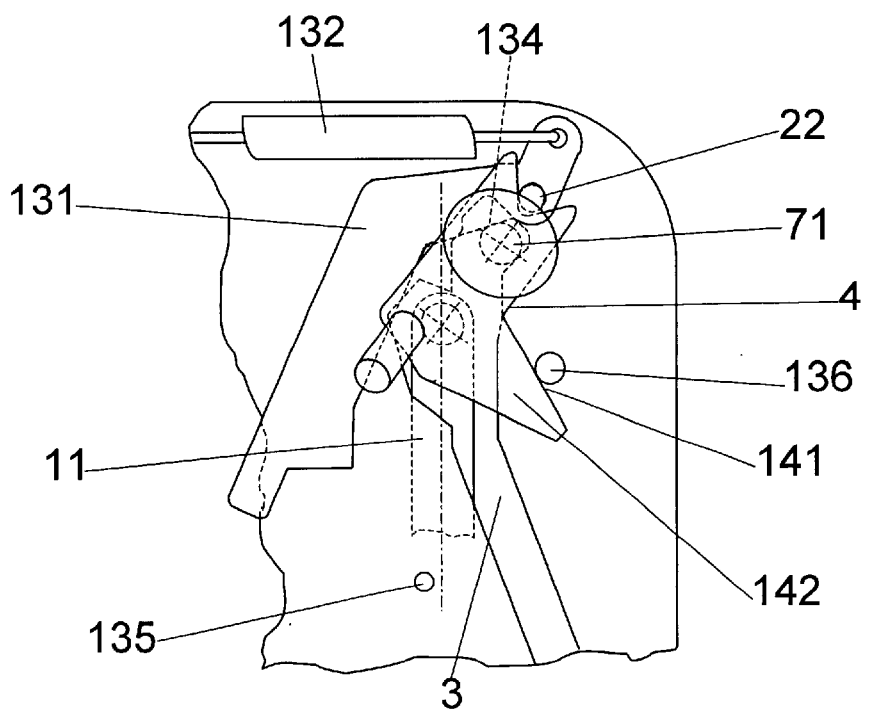
FIG. 16 is a schematic plan view depicting a portion of the tape loading apparatus of the third exemplary embodiment of the present invention, in a state immediately before completion of the loading operation.
Figure 17:
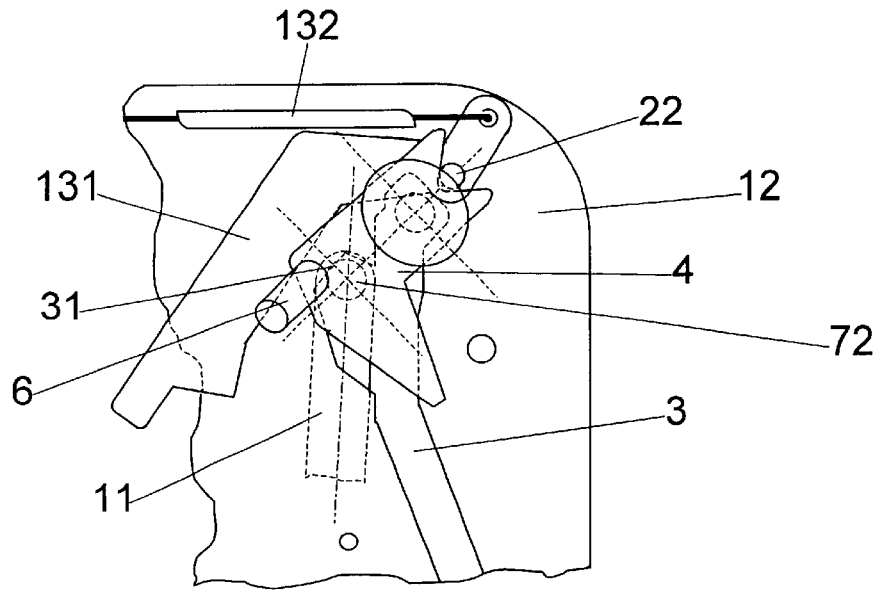
FIG. 17 is a schematic plan view depicting a portion of the tape loading apparatus of the third exemplary embodiment of the present invention, upon completion of the loading operation.

FIG. 13 is a schematic plan view depicting a portion of the tape loading apparatus of the third exemplary embodiment of this invention, in the middle of a loading operation; FIG. 14 is a schematic plan view of a portion of the same apparatus at the moment movable carriage turning means begins to turn a movable carriage 4; FIG. 15 is a schematic plan view of the portion of the same apparatus with the movable carriage in a middle of turn by the movable carriage turning means; FIG. 16 is a schematic plan view of the portion depicting a state immediately before completion of the loading operation; and FIG. 17 is another schematic plan view of the portion of the same apparatus upon completion of the loading operation.

In FIG. 13, there is provided a restrictive guide plate 131 having a plate-like body disposed in a rotatable manner about a stopper 22 mounted on a chassis base 12. The restrictive guide plate 131 is biased to be rotatable in a counterclockwise direction by a tension spring 132, of which one end (not show in the figure) is fixed to the chassis base 12, and the other end is connected to one end of the restrictive guide plate 131. On the other hand, movement of the restrictive guide plate 131 is restricted by a position stopper pin 135 mounted on the chassis base 12, to which the restrictive guide plate 131 stays in contact. Therefore, the restrictive guide plate 131 is held in such a position that a side edge 133 of restrictive guide plate 131 obstructs a portion of a guide channel 3, wherein a restrictive end 31 is formed in continuity thereto, in the chassis base 12.

The movable carriage 4 has a wing-like projection 142 with a turning side edge 141 for causing the movable carriage 4 to turn when it comes in contact with a turning guide pin 136 mounted on the chassis base 12. There are a tape loading post 5 and a tape guide pin 6 provided on an upper surface of the movable carriage 4, and a first guide pin 71 and a second guide pin 72 provided on the underside of the movable carriage 4, similar to the first exemplary embodiment.

The movable carriage 4 performs the loading operation by a thrusting force of a second arm 11 connected rotatably to the second guide pin 72 on the movable carriage 4. Although an axis of rotation of the restrictive guide plate 131 is set on the stopper 22 in this embodiment, another pin may be mounted on the chassis base 12.

As shown in FIG. 14, as the loading operation advances, and at the moment when the first guide pin 71 on the movable carriage 4 passes the portion of the guide channel 3, wherein the restrictive end 31 is formed in continuity thereto in the chassis base 12, the turning side edge 141 at the wing-like projection 142 of the movable carriage 4 comes in contact with the turning guide pin 136 mounted on the chassis base 12. The first guide pin 71 also comes in contact with a sloped turning edge 134 of the restrictive guide plate 131 at approximately the same time.

As the loading operation further advances, the first guide pin 71 on the movable carriage 4 pushes the sloped turning edge 134 of the restrictive guide plate 131, as shown in FIG. 15, to turn the restrictive guide plate 131 clockwise against the tension spring 132. At the same time, the turning side edge 141 at the wing-like projection 142 of the movable carriage 4 is pushed by the turning guide pin 136 mounted on the chassis base 12. This causes the movable carriage 4 to turn clockwise, and thereby the second guide pin 72 on the movable carriage 4 begins to move in its way into the restrictive end 31 formed in continuity to the guide channel 3.

Referring now to FIG. 16, as the loading operation advances furthermore, the first guide pin 71 on the movable carriage 4 pushes further the sloped turning edge 134 of the restrictive guide plate 131, to turn the restrictive guide plate 131 clockwise. At the same time, the clockwise turning movement of the movable carriage 4 advances furthermore at the same time, and a V-shaped notched portion at a leading end of the movable carriage 4 is limited at a position when it comes into contact with the stopper 22 provided on the chassis base 12.

When the loading operation advances even further, the second guide pin 72 on the movable carriage 4 is pushed forward by the second arm 11, while the V-shaped notched portion at a leading end of the movable carriage 4 is in the abutted position on the stopper 22. This caused the movable carriage 4 to turn clockwise further about the stopper 22. As shown in FIG. 17, the movable carriage 4 is held in a second position, when the second guide pin 72 on the movable carriage 4 comes into contact upon the restrictive end 31 formed in continuity to the guide channel 3 in the chassis base 12. Similar to the first exemplary embodiment, the tape guide pin 6 on the movable carriage 4 moves close to the head cylinder 1, and the loading operation is completed when the tape guide pin 6 places a magnetic tape 13 at a predetermined angle around the head cylinder.

According to the third exemplary embodiment, as has been described, the movable carriage 4 can be turned clockwise by making the wing-like projection 142 of the movable carriage 4 come in contact to the turning guide pin 136 mounted on the chassis base 12. This moves the tape guide pin 6 on the movable carriage 4 closer to the head cylinder 1, enabling it to place the magnetic tape is around the head cylinder 1, thereby achieving the same effect as in the first exemplary embodiment.

Fourth Exemplary Embodiment

Referring now to FIG. 18 through FIG. 21, there is described yet another example of movable carriage turning means pertinent to a tape loading apparatus according to a fourth exemplary embodiment of the present invention.

Figure 18:
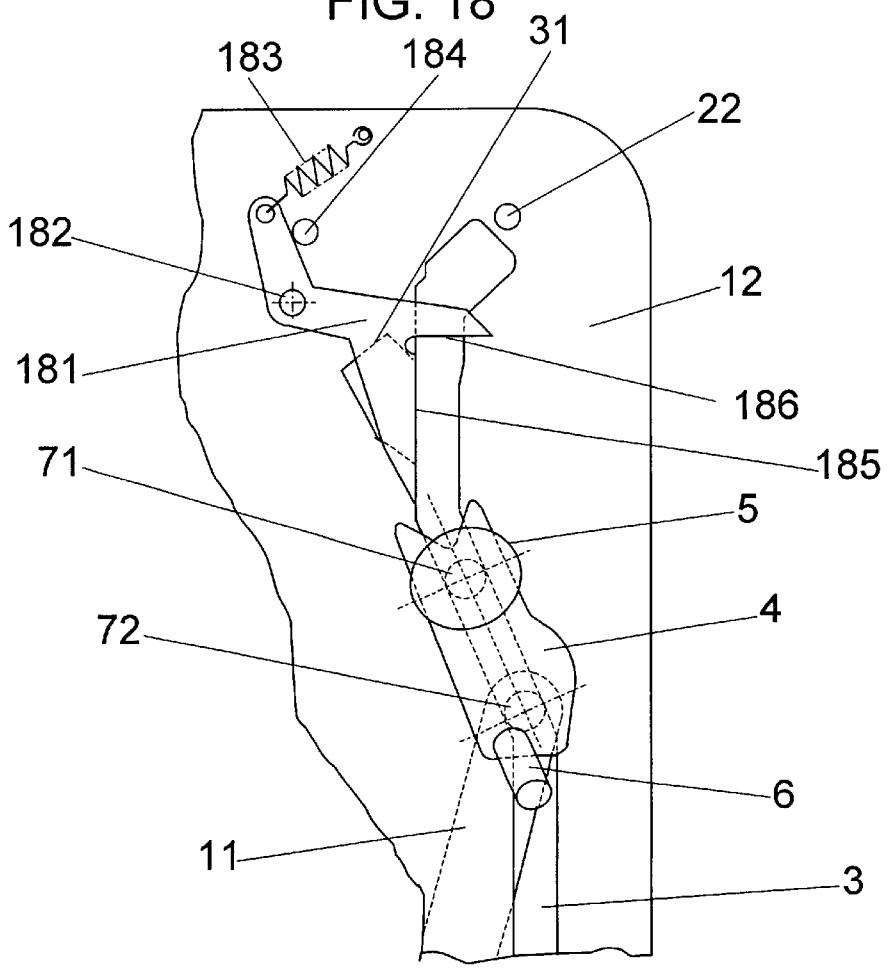
FIG. 18 is a schematic plan view depicting a portion of a tape loading apparatus of a fourth exemplary embodiment of the present invention, in the middle of a loading operation.
Figure 19:
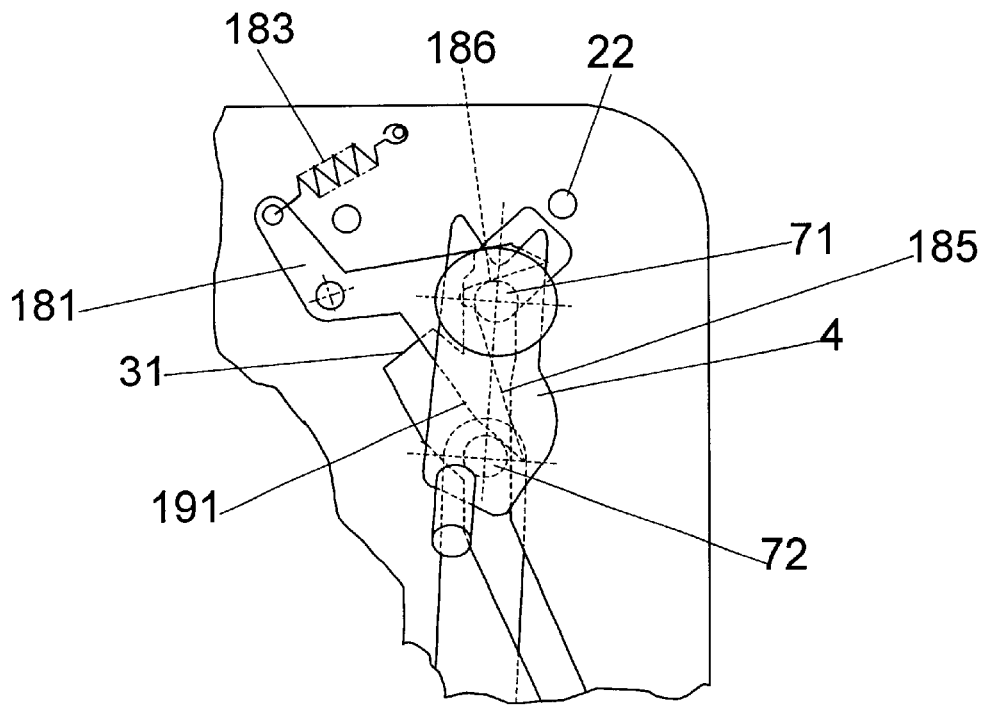
FIG. 19 is a schematic plan view depicting a portion of the tape loading apparatus of the fourth exemplary embodiment of the present invention, at an initial stage when the movable carriage begins to turn.
Figure 20:
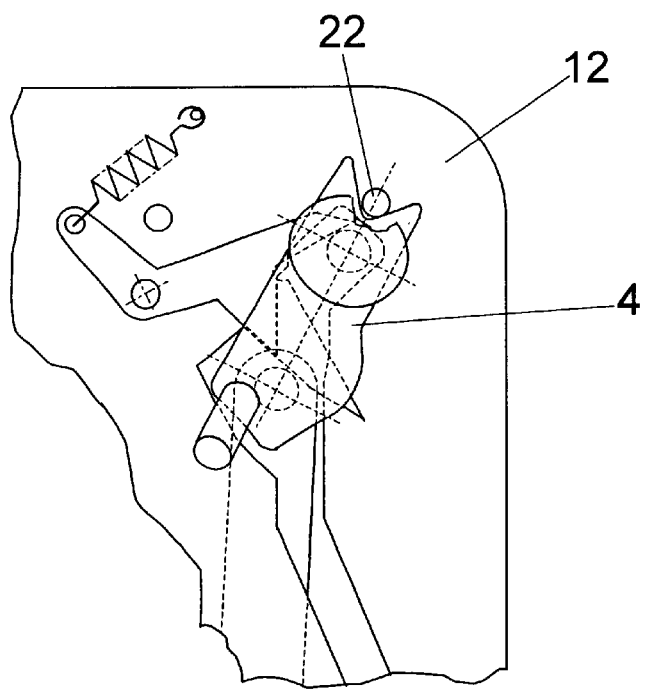
FIG. 20 is a schematic plan view depicting a portion of the tape loading apparatus of the fourth exemplary embodiment of the present invention, in a state immediately before completion of the loading operation.
Figure 21:
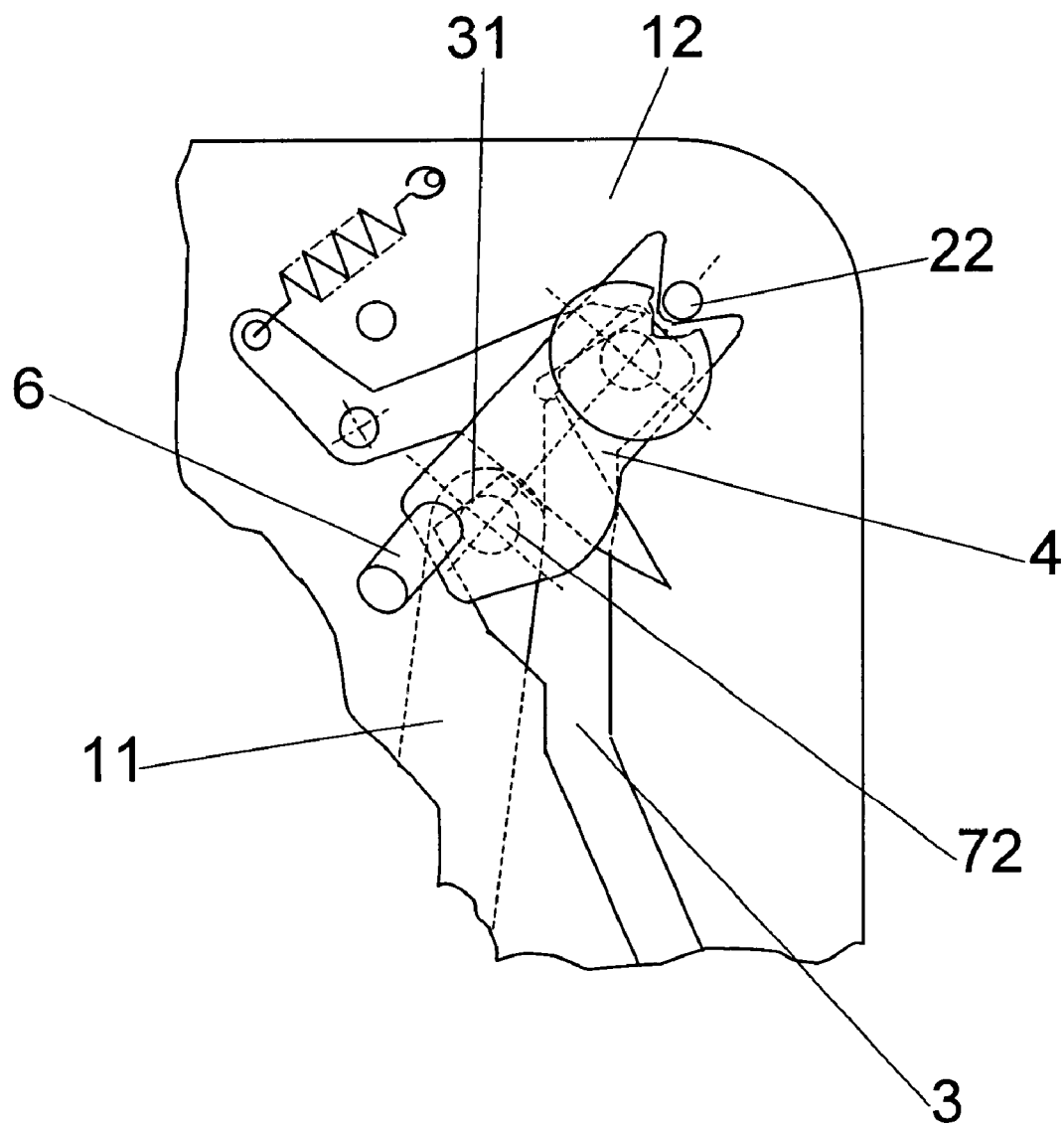
FIG. 21 is a schematic plan view depicting a portion of the tape loading apparatus of the fourth exemplary embodiment of the present invention, upon completion of the loading operation.
Figure 22:
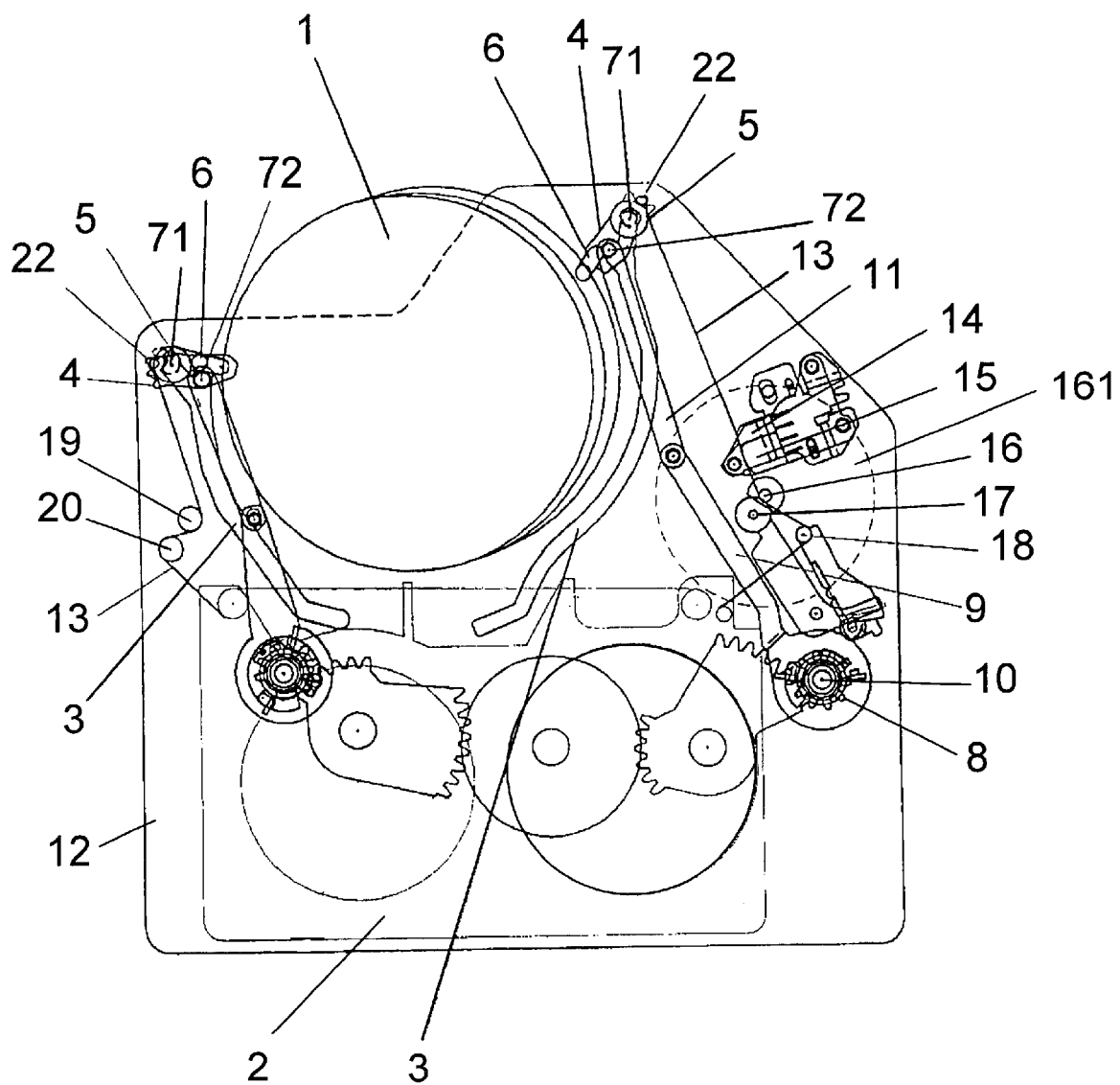
FIG. 22 is a schematic plan view depicting a tape loading apparatus of the prior art.
Figure 23:
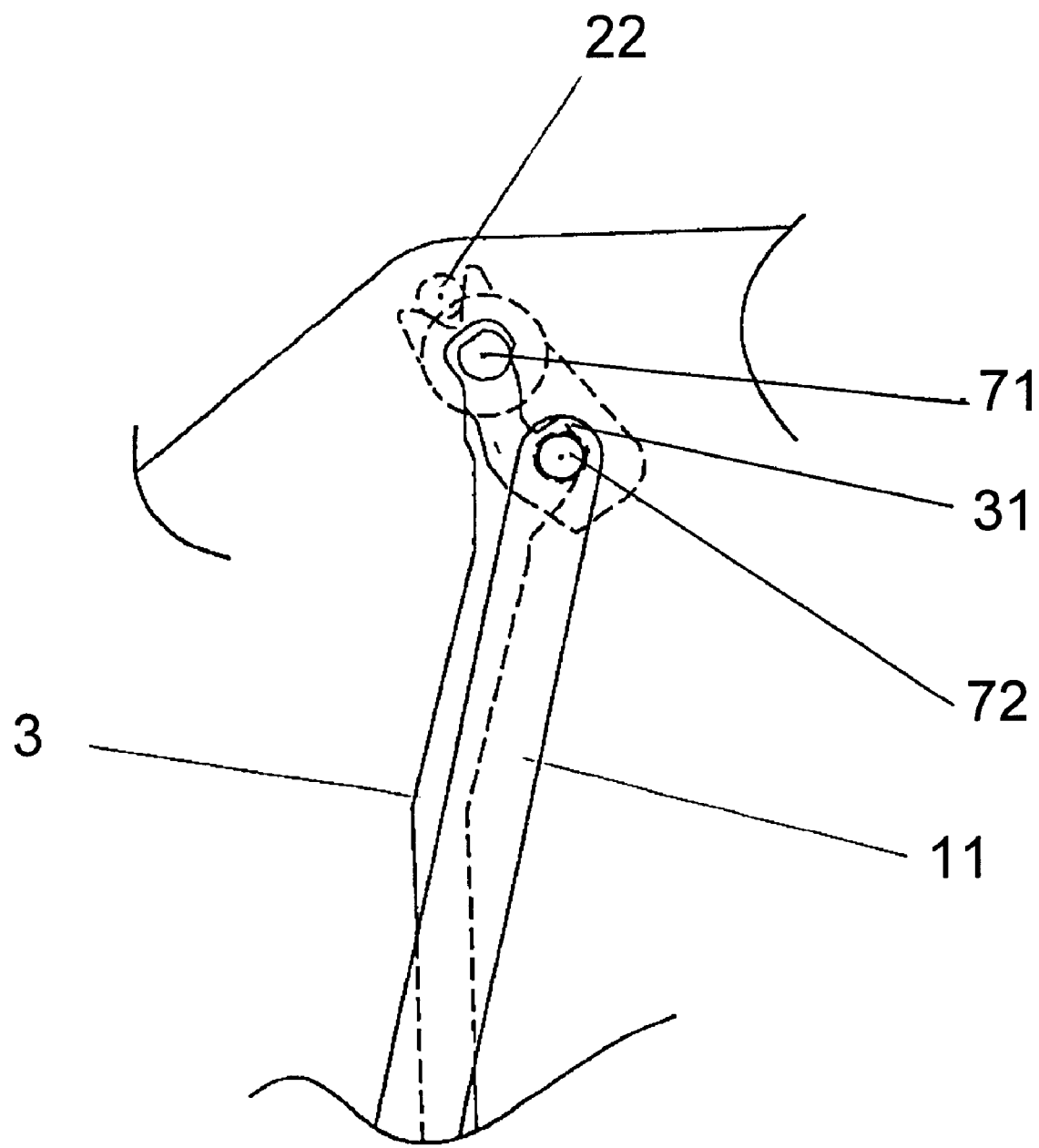
FIG. 23 is a schematic plan view depicting an essential portion of the tape loading apparatus of the prior art, as viewed from the reverse side.

FIG. 18 is a schematic plan view depicting a portion of the tape loading apparatus of the fourth exemplary embodiment of this invention, in a middle of a loading operation; FIG. 19 is a schematic plan view of the portion of the same apparatus at an initial stage wherein a movable carriage is being turned by the movable carriage turning means; FIG. 20 is a schematic plan view of the same portion depicting a state immediately prior to completion of the loading operation; and FIG. 21 is a schematic plan view of the portion of the same apparatus upon completion of the loading operation.

In FIG. 18, the movable carriage 4 is provided with a tape loading post 5 and a tape guide pin 6 on an upper surface of the movable carriage 4, and a first guide pin 71 and a second guide pin 72 on an lower surface of the movable carriage 4, similar to the first exemplary embodiment. The movable carriage 4 is pushed by a second arm 11 connected rotatably to the second guide pin 72 on the movable carriage 4, and moves along a guide channel 3 formed in a chassis base 12. There is a restrictive turning plate 181 having a plate-like body disposed in a rotatable manner about a pin 182 mounted on the chassis base 12 near an area where the loading operation ends. One end of the restrictive turning plate 181 is connected to a tension spring 183, of which the other end is retained by the chassis base 12. The tension spring 183 biases the restrictive turning plate 181 in a manner such that the restrictive turning plate 181 is rotatable in a clockwise direction. Normally, the turning movement of the restrictive turning plate 181 is restricted, and it is held in position by a position stopper pin 184 mounted on the chassis base 12, to which the restrictive turning plate 181 stays in contact due to a biasing force of the tension spring 183. In a state where the turning movement is restricted, the restrictive turning plate 181 obstructs a portion of the guide channel 3, wherein a restrictive end 31 is formed in continuity thereto, with a side edge 185, i.e. a portion of the restrictive turning plate 181 at a side opposite the portion connected by the tension spring 183, with respect to the pin 182. Another portion of the restrictive turning plate 181 includes a push-to-turn edge 186 having a length greater than a width of the guide channel 3.

When the loading operation advances, up to the moment that the first guide pin 71 on the movable carriage 4 passes by the portion of the guide channel 3, wherein the restrictive end 31 is formed in continuity thereto in the chassis base 12, the first guide pin 71 pushes the push-to-turn edge 186 of the restrictive turning plate 181. This causes the restrictive turning plate 181 to turn counterclockwise against the biasing force of the tension spring 183. Then, as shown in FIG. 19, the second guide pin 72 on the movable carriage 4 comes in contact to a guide slope 191 at a back side of the side edge portion 185 of the restrictive turning plate 181, which is made to obstruct a portion of the guide channel 3 having a restrictive end 31 formed in continuity thereto. The second guide pin 72 is guided along the guide slope 191 into a clockwise movement of the movable carriage 4.

As shown in FIG. 20, when the loading operation advances further, a V-shaped notched portion at a leading end of the movable carriage 4 is restricted at a position where it comes into contact upon the stopper 22 provided on the chassis base 12.

As the loading operation continues to advance further, a thrusting force of the second guide pin 72 delivered by the second arm 11 causes the movable carriage 4 to turn clockwise furthermore about the stopper 22. As shown in FIG. 21, the movable carriage 4 is held in a second position when the second guide pin 72 on the movable carriage 4 comes into contact upon the restrictive end 31 formed in continuity to the guide channel 3. Similar to the first exemplary embodiment, the tape guide pin 6 on the movable carriage 4 moves closer to the head cylinder 1, and the loading operation is completed when the tape guide pin 6 places a magnetic tape 13 at a predetermined angle around the head cylinder 1.

According to the fourth exemplary embodiment, as has been described, the movable carriage 4 can be turned clockwise by making the restrictive turning plate 181 disposed rotatably on the pin 182 mounted on the chassis base 12 to turn clockwise by the first guide pin 71 on the movable carriage. At the same time, the second guide pin 72 on the movable carriage slides along the guide slope of the restrictive turning plate being turned. This moves the tape guide pin 6 on the movable carriage 4 closer to the head cylinder 1, enabling it to place the magnetic tape 13 around the head cylinder 1, thereby achieving the same effect as the first exemplary embodiment.

As has been described, the present invention is able to provide a toggle mechanism at a low cost by adopting a movable carriage turning means having a turntable, for example, composed to be operable in such a manner as to move a movable carriage reversibly along a guide channel, and to turn the movable carriage toward a direction where a tape guide pin moves closer to a head cylinder by bringing the movable carriage into contact upon the turntable near an end of the guide channel. In addition, the invention is able to realize a small magnetic recording/reproduction device, as it can reduce a space occupied by an operating area of the toggle mechanism for moving the movable carriage toward the cylinder.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A tape loading apparatus comprising:
   a chassis base provided with a head cylinder, and including a guide channel having a first position and a second position;
   a movable carriage having a tape loading post and a tape guide pin on an upper surface, and a first guide pin and a second guide pin on a lower surface thereof, both said first and second guide pins engaged slidably in said guide channel;
   a toggle mechanism having a first end connected rotatably to said movable carriage, and a second end located at one side of said guide channel proximate to said head cylinder, said toggle mechanism moving said movable carriage reversibly between said first position and said second position in a sliding manner along said guide channel; and
   movable carriage turning means for turning said movable carriage, wherein said tape guide pin moves close to a side of said head cylinder, in a vicinity of said second position.

2. The tape loading apparatus according to claim 1, wherein said movable carriage turning means comprises a plate-like body rotatably mounted on said chassis base at a position proximate to said second position.

3. The tape loading apparatus according to claim 2, wherein said plate-like body has a slit capable of receiving therein said first guide pin and said second guide pin in a sliding manner.

4. The tape loading apparatus according to claim 1, wherein said movable carriage turning means comprises a turntable having a slit capable of receiving therein said first guide pin and said second guide pin in a sliding manner, said turntable mounted rotatably on said chassis base at a position in proximity to said second position, and
   wherein said turntable is normally in a position where said slit is in alignment with said guide channel; said movable carriage comes in contact with a portion of said turntable after said first guide pin and said second guide pin slide into said slit in a course of movement of said movable carriage; and said turntable turns in response to a further movement of said movable carriage, causing said movable carriage to turn in a direction such that said tape guide pin moves to a position proximate to said head cylinder.

5. The tape loading apparatus according to claim 1, wherein said chassis base further comprises a first guide wall and a second guide wall adjacent said second position, and said movable carriage further comprises a first turning guide pin and a second turning guide pin on the upper surface thereof, and
   wherein said movable carriage is turned by said first guide wall and said second guide wall, respectively guiding said first turning guide pin and said second turning guide pin on said movable carriage in a sliding manner.

6. The tape loading apparatus according to claim 1, wherein said chassis base is further provided with a turning guide pin adjacent said second position, and said movable carriage has a wing-like projection, and
   wherein said movable carriage turns when said wing-like projection to contacts said turning guide pin.

7. The tape loading apparatus according to claim 1, wherein said movable carriage turning means comprises a restrictive turning plate mounted rotatably on said chassis base at a position proximate to said second position, and
   wherein said restrictive turning plate turns when said first guide pin comes in contact with a portion thereof, and a further portion of said restrictive turning plate guides said movable carriage in a sliding manner.

8. The tape loading apparatus according to claim 7, wherein said second guide pin is positioned on a side close to said tape guide pin with respect to said first guide pin.

9. The tape loading apparatus according to claim 1, wherein one end of said toggle mechanism is connected rotatably to said second guide pin provided on the lower surface of said movable carriage.

10. A tape loading apparatus comprising:
   a chassis base provided with a head cylinder, and including a guide channel having a first position and a second position;
   a movable carriage having a tape loading post and a tape guide pin on an upper surface, and a first guide pin and a second guide pin on a lower surface thereof, both said first and second guide pins engaged slidably in said guide channel;
   a toggle mechanism having a first end connected rotatably to said movable carriage, said toggle mechanism moving said movable carriage reversibly between said first position and said second position in a sliding manner along said guide channel; and
   movable carriage turning means comprising a plate-like body mounted rotatably on said chassis base at a position proximate to said second position, for turning said movable carriage so that said tape guide pin moves close to a side of said head cylinder.

11. The tape loading apparatus according to claim 10, wherein said plate-like body has a slit capable of receiving therein said first guide pin and said second guide pin in a sliding manner.

12. The tape loading apparatus according to claim 1, wherein said plate-like body is normally in a position where said slit is in alignment with said guide channel; said movable carriage comes in contact with a portion of said plate-like body after said first guide pin and said second guide pin slide into said slit in a course of movement of said movable carriage; and said turntable turns in response to a further movement of said movable carriage, causing said movable carriage to turn such that said tape guide pin moves to a position close to said head cylinder.

13. The tape loading apparatus according to claim 10, wherein said chassis base further comprising a turning guide pin adjacent of said second position, and said movable carriage further comprising a wing-like projection, and
   wherein said movable carriage turns when said wing-like projection comes in contact with said turning guide pin.

14. The tape loading apparatus according to claim 10, wherein said movable carriage turning means comprises a restrictive turning plate mounted rotatably on said chassis base at a position proximate to said second position, and
   wherein said restrictive turning plate turns when said first guide pin comes in contact with a portion thereof, and a further portion of said restrictive turning plate guides said movable carriage in a sliding manner.

15. The tape loading apparatus according to claim 14, wherein said second guide pin is positioned on a side close to said tape guide pin with respect to said first guide pin.

16. The tape loading apparatus according to claim 10, wherein one end of said toggle mechanism is connected rotatably to said second guide pin provided on the lower surface of said movable carriage.

17. A tape loading apparatus comprising:
   a chassis base provided with a head cylinder, including a guide channel having a first position and a second position, said chassis base further having a first guide wall and a second guide wall adjacent said second position;
   a movable carriage having a tape loading post, a tape guide pin, a first turning guide pin and a second turning guide pin on an upper surface, and a first guide pin and a second guide pin on a lower surface thereof, both said first and second guide pins engaged slidably in said guide channel;
   a toggle mechanism having one end connected rotatably to said movable carriage, said toggle mechanism moving said movable carriage reversibly between said first position and said second position in a sliding manner along said guide channel; and
   movable carriage turning means comprising a plate-like body mounted rotatably on said chassis base at a position proximate to said second position, for turning said movable carriage so that said tape guide pin moves close to a side of said head cylinder,
      wherein said movable carriage is turned by said first guide wall and said second guide wall respectively guiding said first turning guide pin and said second turning guide pin on said movable carriage in a sliding manner.

18. The tape loading apparatus according to claim 17, wherein one end of said toggle mechanism is connected rotatably to said second guide pin.

19. The tape loading apparatus according to claim 1, wherein said chassis base is further provided with a restrictive end formed in continuity with said guide channel at said second position, and a loading operation is completed when said second guide pin contacts said restrictive end, and wherein a movement of said movable carriage is restricted at a position of the contact.

20. The tape loading apparatus according to claim 10, wherein said chassis base is further provided with a restrictive end formed in continuity with said guide channel at said second position, and a loading operation is completed when said second guide pin contacts said restrictive end, and wherein a movement of said movable carriage is restricted at a position of the contact.

21. The tape loading apparatus according to claim 1, wherein said moveable carriage is moved between said first position and said second position by extension and retraction of said toggle mechanism.

22. The tape loading apparatus according to claim 10, wherein said moveable carriage is moved between said first position and said second position by extension and retraction of said toggle mechanism.

23. The tape loading apparatus according to claim 17, wherein said moveable carriage is moved between said first position and said second position by extension and retraction of said toggle mechanism.

* * * * *

UNITED STATES PATENT AND TRADEMARK OFFICE
CERTIFICATE OF CORRECTION

PATENT NO. : 6,396,655 B1
DATED : May 28, 2002
INVENTOR(S) : Yasui

It is certified that error appears in the above-identified patent and that said Letters Patent is hereby corrected as shown below:

Column 13,
Line 28, "1" should read -- 11 --.

Signed and Sealed this

Twenty-fourth Day of December, 2002

JAMES E. ROGAN
*Director of the United States Patent and Trademark Office*